US010087906B2

(12) United States Patent
Nakamura et al.

(10) Patent No.: US 10,087,906 B2
(45) Date of Patent: Oct. 2, 2018

(54) HYDRAULIC TURBINE AND PIPE

(71) Applicant: Kabushiki Kaisha Toshiba, Minato-ku (JP)

(72) Inventors: Kazuyuki Nakamura, Yokohama (JP); Toshimasa Mukai, Kamakura (JP); Satoru Kuboya, Kawasaki (JP); Hajime Koyama, Yokohama (JP); Takuya Tomioka, Kawasaki (JP); Takanori Nakamura, Yokohama (JP); Naritoshi Nakagawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 515 days.

(21) Appl. No.: 14/341,943

(22) Filed: Jul. 28, 2014

(65) Prior Publication Data

US 2015/0056061 A1    Feb. 26, 2015

(30) Foreign Application Priority Data

Aug. 20, 2013 (JP) ................. 2013-170681
Feb. 26, 2014 (JP) ................. 2014-035828
Jul. 2, 2014 (JP) ................. 2014-137072

(51) Int. Cl.
*F03B 3/02* (2006.01)
*F03B 11/00* (2006.01)
(Continued)

(52) U.S. Cl.
CPC ................. *F03B 3/02* (2013.01); *F03B 3/10* (2013.01); *F03B 3/121* (2013.01); *F03B 11/00* (2013.01);
(Continued)

(58) Field of Classification Search
CPC ............. F01D 5/286; F01D 5/288; F03B 3/12
See application file for complete search history.

(56) References Cited

U.S. PATENT DOCUMENTS 2,914,301 A * 11/1959 Hess .................. F03B 15/18
                                                            415/116
5,601,411 A * 2/1997 Usami ................ B23K 35/3086
                                                            415/200
(Continued)

FOREIGN PATENT DOCUMENTS

CN          1971001 A      5/2007
DE   10 2012 014 820 A1    3/2013
(Continued)

OTHER PUBLICATIONS

Office Action dated Jun. 22, 2015 in Australian Patent Application No. 2014206226.
(Continued)

*Primary Examiner* — Logan Kraft
*Assistant Examiner* — Justin A Pruitt
(74) *Attorney, Agent, or Firm* — Oblon, McClelland, Maier & Neustadt, L.L.P.

(57) ABSTRACT

A hydraulic turbine according to an embodiment includes a turbine body, a running water surface provided in the turbine body, the running water surface defining a channel for water, and a coating layer provided on the running water surface, the coating layer being formed by water-repellent paint or hydrophilic paint.

9 Claims, 13 Drawing Sheets

(51) Int. Cl.
*F03B 11/02* (2006.01)
*F03B 3/10* (2006.01)
*F03B 3/12* (2006.01)

(52) U.S. Cl.
CPC ......... *F03B 11/025* (2013.01); *F05B 2200/00* (2013.01); *F05B 2230/90* (2013.01); *F05B 2280/50* (2013.01); *F05B 2280/6011* (2013.01); *Y02E 10/223* (2013.01); *Y02E 10/226* (2013.01); *Y02P 70/525* (2015.11)

(56) References Cited

U.S. PATENT DOCUMENTS

| | | | | |
|---|---|---|---|---|
| 5,873,700 | A * | 2/1999 | Ichikawa | F01D 5/288 415/160 |
| 6,490,506 | B1 * | 12/2002 | March | G05B 23/0283 290/43 |
| 7,033,673 | B2 * | 4/2006 | Wiedemann | B05D 5/02 428/447 |
| 8,132,414 | B2 | 3/2012 | Niizeki et al. | |
| 2005/0019589 | A1 | 1/2005 | Wiedemann et al. | |
| 2006/0110254 | A1 * | 5/2006 | Itzel | C23C 30/00 416/193 A |
| 2008/0080972 | A1 * | 4/2008 | Bunker | F01D 5/225 415/174.5 |
| 2011/0188990 | A1 * | 8/2011 | Farb | F03B 13/00 415/1 |
| 2013/0285383 | A1 * | 10/2013 | Belarbi | F03B 17/063 290/54 |
| 2014/0373354 | A1 * | 12/2014 | Henker | C23C 8/10 29/889.2 |

FOREIGN PATENT DOCUMENTS

| | | | |
|---|---|---|---|
| EP | 2 390 467 A1 | 11/2011 | |
| JP | 63-263291 | 10/1988 | |
| JP | 2-23298 | 1/1990 | |
| JP | 11-72078 A | 3/1999 | |
| JP | 11-311176 A | 11/1999 | |
| JP | 2007-64018 | 3/2007 | |
| JP | WO2013/031001 A1 | 3/2013 | |
| KR | 10-2011-0093440 | 8/2011 | |
| WO | WO 2012/039667 A1 | 3/2012 | |
| WO | WO 2013177612 A1 * | 12/2013 | ......... B63B 35/7926 |

OTHER PUBLICATIONS

New Zealand Office Action dated Nov. 18, 2014, in New Zealand Patent Application No. 627914.
Office Action dated Aug. 21, 2015 in Australian Patent Application No. 2014206226.
Extended European Search Report dated May 6, 2015 in European Patent Application No. 14178234.2.
Combined Chinese Office Action and Search Report dated May 5, 2016 in Patent Application No. 201410406235.0 (with English Translation).
New Zealand Office Action dated Aug. 5, 2014, in New Zealand Patent application No. 627914.
"Ecological Coatings", Company News, (Easy Clean), (Friction Reduction Anti-Friction Coatings), 2000 Series, Jan. 22, 2013, http://www.ecologicalcoatings.com/fritionreduction.html, p. 1.
Combined Chinese Office Action and Search Report dated Oct. 10, 2016 in Patent Application 201410406235.0 with partial English translation and English translation of categories of cited documents.

* cited by examiner

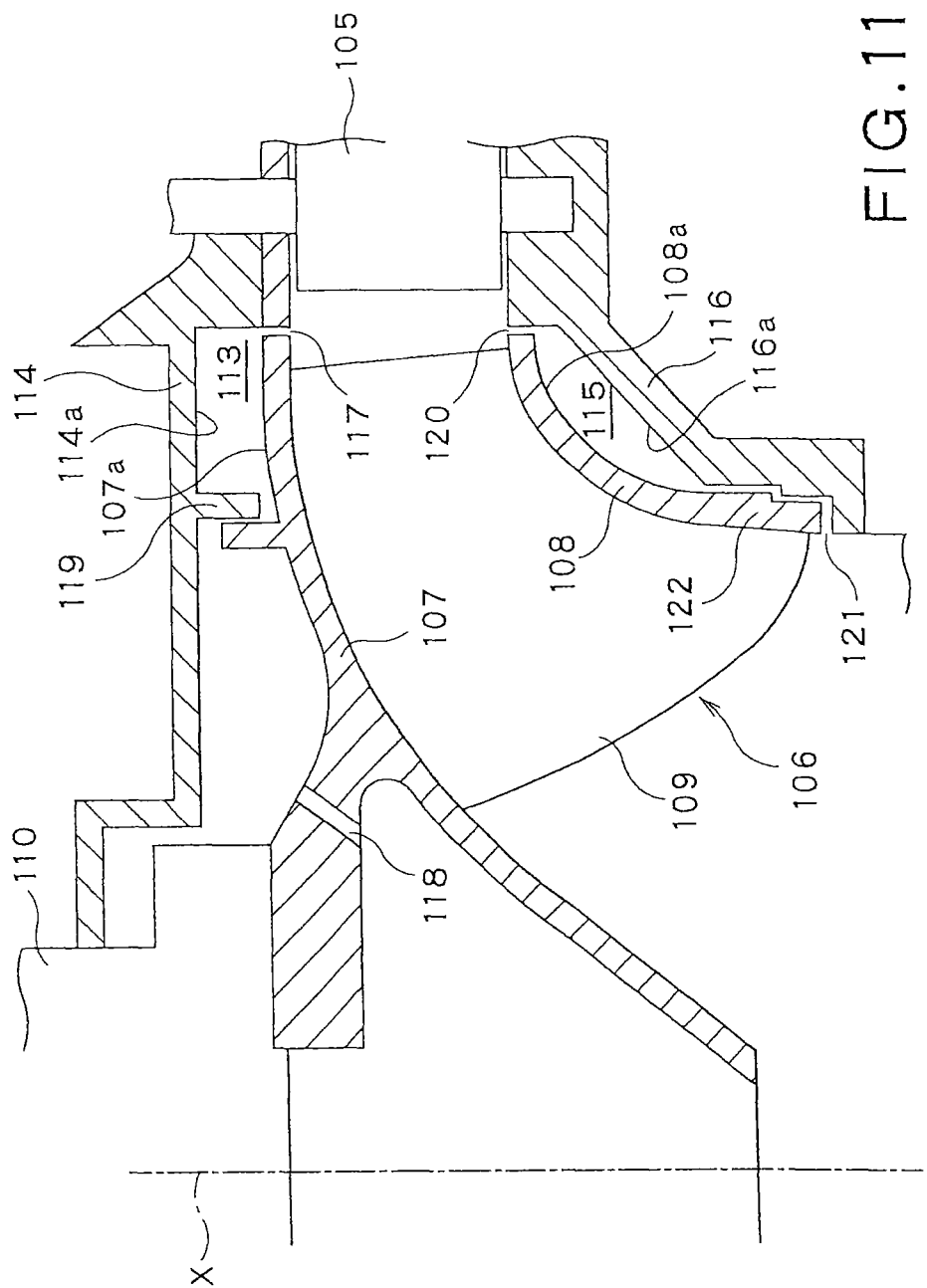

HYDRAULIC TURBINE AND PIPE

CROSS REFERENCE TO RELATED APPLICATIONS

This application is based upon and claims the benefit of priority from Japanese Patent Application Nos. 2013-170681, 2014-035828 and 2014-137072, filed on Aug. 20, 2013, Feb. 26, 2014 and Jul. 2, 2014, respectively, the entire contents of which are incorporated herein by reference.

FIELD

The Embodiments relates to a hydraulic turbine and a pipe.

BACKGROUND

In general, hydraulic turbines such as a Francis turbine, a Kaplan turbine or a Bulb turbine serving as an axial flow turbine or the like are known. Further, as a hydraulic turbine capable of conducting both power generation and pumped storage, a Francis pump hydraulic turbine is known. Here, the Francis pump hydraulic turbine (hereinafter simply referred to as Francis turbine) will be described by way of example.

In the Francis turbine, water flows from an upper reservoir into a spiral casing, and the water flowing into the casing flows into a runner through stay vanes and guide vanes. The guide vanes are configured to be rotated to change an opening degree, thereby enabling adjustment of a flow rate of the water flowing into the runner. The runner is rotated around a hydraulic turbine rotating axis by the water flowing thereinto. Thereby, power is generated at a generator connected to the runner via a main shaft. The water flowing out of the runner is discharged to a lower reservoir through a draft tube.

In this way, the water from the upper reservoir is discharged to the lower reservoir through the casing, the stay vanes, the guide vanes, the runner, and the draft tube. In the meantime, the water flows along a running water surface of a channel which is defined by the running water surface of, for instance, the casing. Thereby, a friction loss occurs at a flow of the water along the running water surface. The friction loss is different depending on a flow velocity and a Reynolds number. In general, the higher the flow velocity, the greater the friction loss, whereas the smaller the Reynolds number, the greater the friction loss.

In the Francis turbine, various losses in addition to the friction loss can occur. For example, a secondary flow loss caused by formation of a flow that does not follow a main flow, a separation loss caused by generation of separation from a flow, and a vortex loss caused by a swirl flow generated from a runner outlet in a draft tube are exemplified.

The secondary flow loss and the separation loss or the like can be reduced by optimizing a shape of each part. However, even in the case of optimizing the shape of each part, the friction loss occurs at a flow of water along a running water surface of each part. For this reason, there is a limitation in reducing the losses of the Francis turbine as a whole by reducing the secondary flow loss and the separation loss or the like.

BRIEF DESCRIPTION OF THE DRAWINGS

FIG. 11 is a partially enlarged cross-sectional view of FIG. 10;

DETAILED DESCRIPTION

A hydraulic turbine according to an embodiment includes a turbine body, a running water surface provided in the turbine body, the running water surface defining a channel for water, and a coating layer provided on the running water surface, the coating layer being formed by water-repellent paint or hydrophilic paint.

A hydraulic turbine according to an embodiment includes a casing into which water flows, and a runner rotated by the water flowing therein from the casing. The runner includes a crown, a band, and a plurality of runner blades provided between the crown and the band. An upper cover is provided outside the crown of the runner and forms a back pressure chamber between the crown and the upper cover. A back pressure chamber coating layer having hydrophilicity is provided on a surface of the crown which is located in the back pressure chamber.

A hydraulic turbine according to an embodiment includes a casing into which water flows, and a runner rotated by the water flowing therein from the casing. The runner includes a crown, a band, and a plurality of runner blades provided between the crown and the band. A lower cover is provided outside the band of the runner and forms a lateral pressure chamber between the band and the lower cover. A lateral pressure chamber coating layer having hydrophilicity is provided in a surface of the band which is located in the lateral pressure chamber.

A pipe according to an embodiment is a pipe connected to a hydraulic turbine. The pipe includes a pipe body, a running water surface that is provided in the pipe body and defines a channel for water, and a coating layer that is provided on the running water surface and has hydrophilicity.

Hereafter, a hydraulic turbine in embodiments will be described with reference to the drawings. Here, a Francis turbine will be described as an example of the hydraulic turbine.

First Embodiment

First, a hydraulic turbine in a first embodiment will be described using FIGS. 1 to 4.

Figure 1:
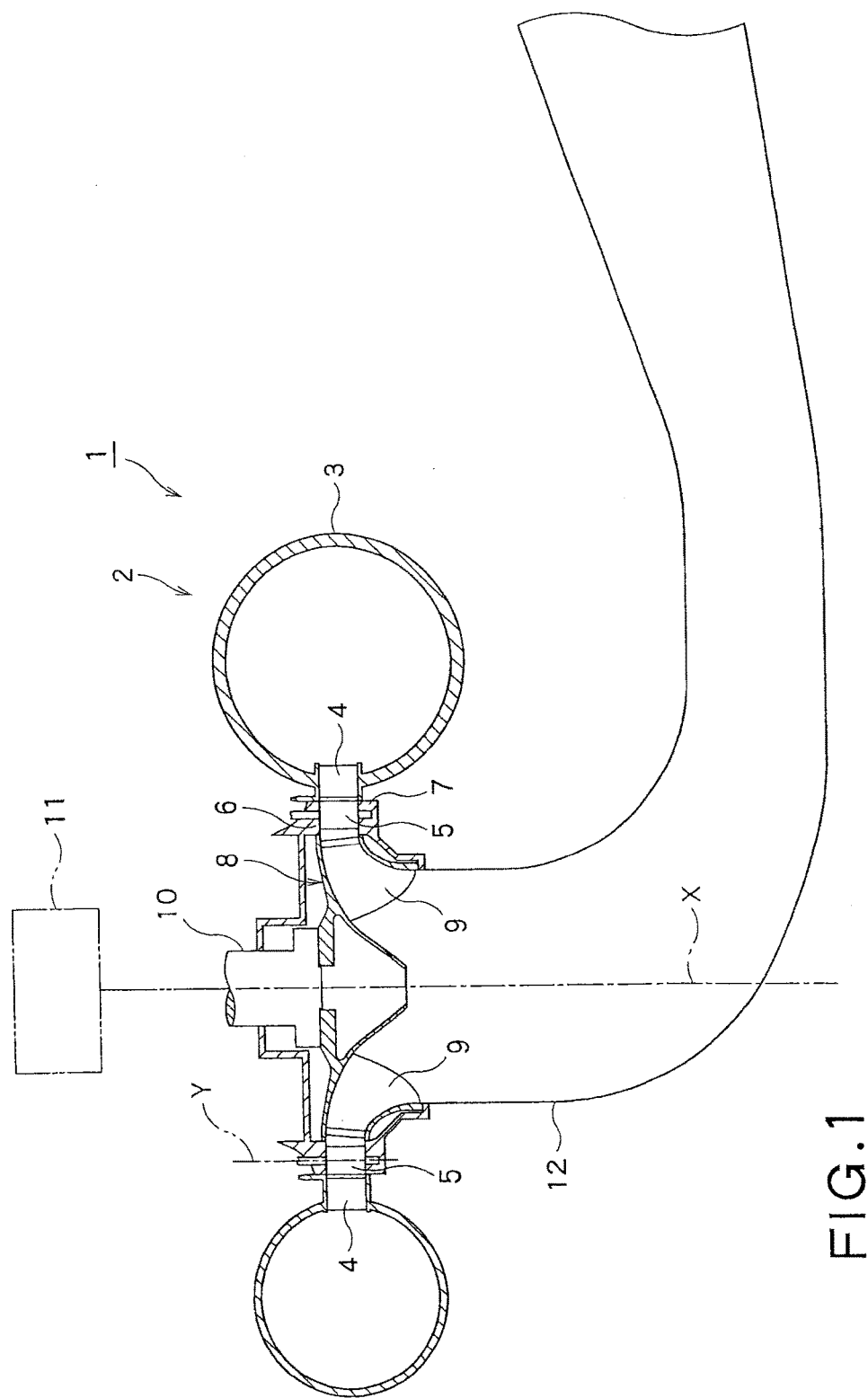
FIG. 1 is a view illustrating an overall configuration of a hydraulic turbine in a first embodiment.

As illustrated in FIG. 1, a Francis turbine 1 is equipped with a turbine body 2 and a running water surface 20 (see FIG. 2A) provided in the turbine body 2.

The turbine body 2 has a spiral casing 3 into which water flows from an upper reservoir 201 (see FIG. 15) through a hydraulic iron pipe 200 during hydraulic turbine operation, a plurality of stay vanes 4, a plurality of guide vanes 5, and a runner 8. Among them, the stay vanes 4 guide the water flowing into the casing 3 to the guide vanes 5 and the runner 8, and are disposed at a given interval in a circumferential direction. A channel 21 in which the water flows is formed between the stay vanes 4. The guide vanes 5 guide the inflow water to the runner 8, and are disposed at a given interval in a circumferential direction. The channel 21 in which the water flows is formed between the guide vanes 5.

Upper and lower covers 6 and 7, which are opposite to each other, are provided at upper and lower sides of the guide vanes 5, respectively. The upper cover 6 and the lower cover 7 rotatably support the guide vanes 5. The guide vanes 5 are rotated to change an opening angle, and thereby a flow rate of the water flowing into the runner 8 is adapted to be adjustable. In this way, a capacity of power generation of a generator motor 11 to be described below is adapted to be adjustable.

The runner 8 is configured to be rotatable around an axis X of rotation with respect to the casing 3, and is rotatably driven by the water flowing from the casing 3 during the hydraulic turbine operation. Further, the runner 8 has a plurality of runner blades 9 disposed at a given interval in a circumferential direction, and the channel 21 in which the water flows is formed between the runner blades 9.

The generator motor 11 is connected to the runner 8 via a main shaft 10. The generator motor 11 generates power based on rotation of the runner 8 during the hydraulic turbine operation, and is configured to rotatably drive the runner 8 during pump operation (during pumped storage operation). A draft tube 12 for restoring a pressure of the water flow flowing out of the runner 8, as a part of the turbine body 2, is provided at a downstream side of the runner 8 during the hydraulic turbine operation. The draft tube 12 is connected to a lower reservoir 202 (see FIG. 15), and the water rotatably driving the runner 8 is adapted to be discharged to the lower reservoir 202.

The running water surface 20 (see FIG. 2A) is provided for each of the casing 3, the stay vanes 4, the guide vanes 5, the upper cover 6, the lower cover 7, the runner 8, and the draft tube 12 of the aforementioned turbine body 2. Each running water surface 20 is adapted to define the channel 21 for the running water such that the water flows in the channel 21.

Figure 2A:
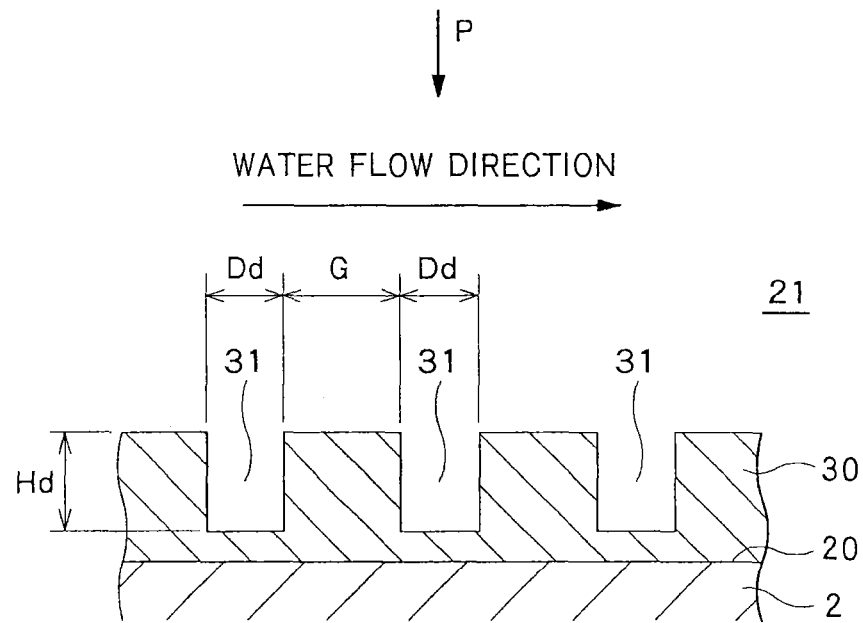
FIG. 2A is a cross-sectional view illustrating a coating layer provided on a running water surface of the hydraulic turbine of FIG. 1.

As illustrated in FIG. 2A, the running water surface 20 is provided with a coating layer 30 formed by water-repellent paint. The coating layer 30 can be formed on the running water surface 20 by coating the water-repellent paint. The water-repellent paint is not particularly limited as long as it has water repellency. For example, paint containing fluorine resin or silicon resin, or ship's bottom paint can be used. Further, the water-repellent paint preferably has a contact angle of, for instance, 75 degrees or more, and more preferably 90 degrees or more, (wherein the contact angle is an angle formed between a surface of the coating layer 30 which is a solid surface and a tangent line to an edge of the water being in contact with the solid surface).

Figure 2B:
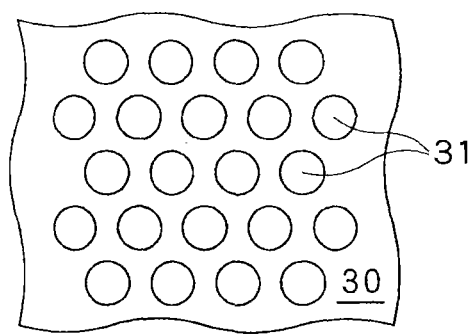
FIG. 2B is a view viewed in a direction of arrow P of FIG. 2A.

The coating layer 30 is preferably provided with a plurality of (or multiple) dimples 31 that are open to the channel 21. The dimples 31 are formed in the coating layer 30 in a concave shape like a small pit. Each dimple 31 preferably has a depth that is not less than 0.05 times and not more than 0.15 times a diameter of an inscribed circle of the dimple 31 when a planar shape of the dimple 31 is a polygonal shape, or a diameter of the dimple 31 when a planar shape of the dimple 31 is a circular shape. Here, as the depth of the dimple 31 is set to not less than 0.05 times the diameter, the dimple 31 can be formed with high precision. As the depth of the dimple 31 is set to not more than 0.15 times the diameter, an increase in friction loss caused by the presence itself of the dimple 31 can be suppressed. On the other hand, the planer shape of the dimple 31 is not particularly limited, but it is preferably, for instance, a circular shape as illustrated in FIG. 2B or a hexagonal shape. For example, if the diameter of the inscribed circle of the polygonal dimple 31 or the diameter (Dd illustrated in FIG. 2A) of the circular dimple 31 is 1 mm, the depth (Hd illustrated in FIG. 2A) of the dimple 31 is preferably not less than 50 μm and not more than 150 μm. A depth of the coating layer 30 is not particularly limited if the dimples 31 can be formed, if the running water surface 20 is not exposed to the bottoms of the dimples 31, and if the material of the coating layer 30 can be left behind.

Further, an interval between the dimples 31 adjacent to each other is preferably not less than 0.8 times and not more than 1.2 times the diameter of the inscribed circle of the dimple 31 when the planar shape of the dimple 31 is the polygonal shape, or the diameter of the dimple 31 when the planar shape of the dimple 31 is the circular shape. Thereby, an effect of reducing viscosity resistance of the water flow according to the dimples 31 can be effectively produced, which is experimentally confirmed by the inventors. For example, if the diameter of the inscribed circle of the polygonal dimple 31 or the diameter (Dd illustrated in FIG. 2A) of the circular dimple 31 is 1 mm, the interval (G illustrated in FIG. 2A) between the dimples 31 is preferably not less than 0.8 mm and not more than 1.2 mm.

Figure 3A:
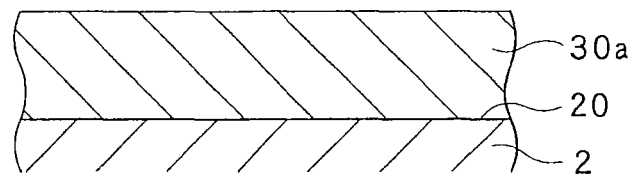
FIGS. 3A to 3C are views illustrating a method of forming the coating layer illustrated in FIGS. 2A and 2B.
Figure 3B:
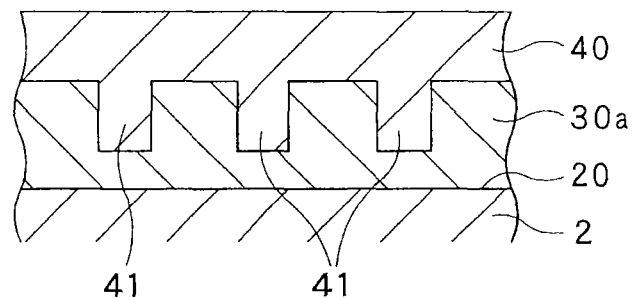
Figure 3C:
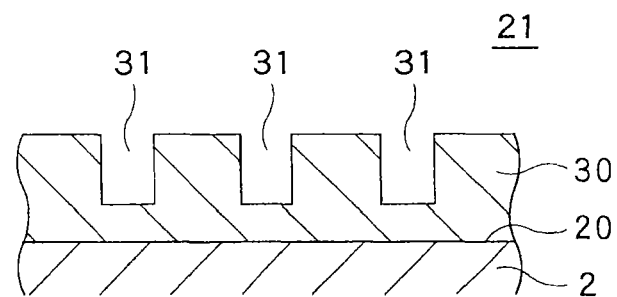

As illustrated in FIGS. 3A to 3C, the coating layer 30 can be formed using, for example, a mold 40 having bulges 41 corresponding to the dimples 31 of the coating layer 30. In this case, as illustrated in FIG. 3A, the water-repellent paint is applied to the running water surface 20 in a film shape at a given thickness first, and a paint film 30a is formed. Subsequently, as illustrated in FIG. 3B, the mold 40 is pressed against the paint film 30a of the water-repellent paint. In this case, the mold 40 is pressed such that the paint film 30a remains between the bulges 41 of the mold 40 and the running water surface 20. Next, in the state in which the mold 40 is pressed, the paint film 30a is dried and cured. After the paint film 30a is cured, the mold 40 is removed as illustrated in FIG. 3C. In this way, the coating layer 30 can be obtained in the present embodiment. The method of forming the coating layer 30 is not limited to the aforementioned method. For example, after the paint film of the water-repellent paint is cured, the mold 40 may be placed on the cured paint film, and the water-repellent paint may be applied to the surroundings of the bulges 41 of the mold 40, and be cured. Thereby, the coating layer 30 can also be obtained in the present embodiment.

Such a coating layer 30 is provided on each of the running water surfaces 20 of the casing 3, the stay vane 4, the guide vane 5, the upper cover 6, the lower cover 7, the runner 8, and the draft tube 12. In other words, without other restraints, the coating layer is preferably provided on the running water surface 20 of each member of the Francis turbine 1.

Next, an operation of the present embodiment configured in this way will be described.

When the hydraulic turbine operation is conducted in the Francis turbine according to the present embodiment, as illustrated in FIG. 1, water flows from the upper reservoir 201 (see FIG. 15) into the casing 3 through the hydraulic iron pipe 200. The water flowing into the casing 3 flows from the casing 3 into the runner 8 through the stay vanes 4 and the guide vanes 5. The runner 8 is rotatably driven by the water flowing into the runner 8. Thereby, the generator motor 11 connected to the runner 8 via the main shaft 10 is driven to produce electric power. The water flowing into the runner 8 is discharged from the runner 8 through the draft tube 12 to the lower reservoir 202. During which the hydraulic turbine operation is conducted, the guide vanes 5 are rotated. Thereby, the opening degree of the guide vanes 5 is adjusted, and the capacity of power generation of the generator motor 11 is adjusted.

During pump operation, the generator motor 11 rotatably drives the runner 8, thereby pumping up the water in the draft tube 12. The water pumped up into the runner 8 flows into the casing 3 through the guide vanes 5 and the stay vanes 4, and is discharged from the casing 3 through the hydraulic iron pipe 200 to the upper reservoir 201. The guide vanes 5 and stay vanes 4 guide the water flowing out of the runner 8 to the casing 3. In this case, the opening degree of the guide vanes 5 is variable to have a proper pumpage depending on a pump head.

During the hydraulic turbine operation and the pump operation, a flow of the water along the running water surface 20 is formed inside the channel 21 defined by the running water surface 20 of the casing 3, the running water surfaces 20 of the stay vanes 4, the running water surfaces 20 of the guide vanes 5, the running water surface 20 of the upper cover 6, the running water surface 20 of the lower cover 7, the running water surface 20 of the runner 8, and the running water surface 20 of the draft tube 12. The running water surface 20 is provided with the coating layer 30 (see FIG. 2A) formed by the water-repellent paint. Thereby, the water flowing near the coating layer 30 can flow to be repelled from the coating layer 30, and the viscosity resistance of the water flow near the coating layer 30 can be reduced. For this reason, the friction loss of the main flow against the running water surface 20 can be reduced.

Figure 4:
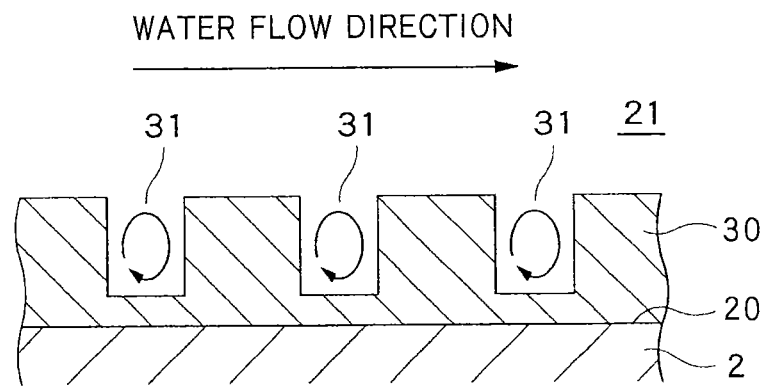
FIG. 4 is a view illustrating a function of dimples of the coating layer of FIGS. 2A and 2B.

Further, as described above, the coating layer 30 is provided with the a plurality of dimples 31. While entering or leaving the dimples 31, part of the water is affected by a flow in a water flow direction, and flows to circulate in the dimples 31 as illustrated in FIG. 4. In this case, the water in the dimples 31 can flow to be repelled from walls of the dimples 31 formed by the water-repellent paint, and smoothly circulate in the dimples 31. For this reason, the water flow circulating in the dimples 31 exerts the same function as a roller used in a common conveyer or the like, still more reduces the viscosity resistance of the flow of the water flowing above the dimples 31, and allows the main flow to flow smoothly on the running water surface 20.

Incidentally, in head energy Ph of the water flowing into the Francis turbine 1, assuming that a density of the water be ρ, a flow rate be Q, a head be H, and gravitational acceleration be g, the head energy Ph is expressed as follows.

$$Ph = \rho \times g \times Q \times H$$

Assuming the friction loss of the water occurring on the running water surface 20 be Lf, Lf of the head energy Ph is used as friction energy. Further, if the loss caused by the shape of the hydraulic turbine, such as the secondary flow loss, the separation loss, or the vortex loss described above, is defined as Ls, energy Pt that can be used to rotate the runner 8 is as follows.

$$Pt = Ph - Lf - Ls$$

However, as described above, as the running water surface 20 is provided with the coating layer 30 formed by the water-repellent paint, the viscosity resistance of the water flow near the coating layer 30 can be reduced. For this reason, it is possible to reduce the friction loss Lf, and increase the energy Pt that can be used to rotate the runner 8.

According to the present embodiment, the running water surface 20 is provided with the coating layer 30 formed by the water-repellent paint. Thereby, it is possible to reduce the viscosity resistance of the water flow in the vicinity of the coating layer 30, and to reduce the friction loss of the water flow flowing in the channel 21 defined by the running water surfaces 20. For this reason, it is possible to make good use of energy of the water flowing into the casing 3 to improve efficiency of the hydraulic turbine.

Further, according to the present embodiment, the coating layer 30 is provided with the a plurality of dimples 31. Thereby, it is possible to more reduce the viscosity resistance of the water flow in the vicinity of the coating layer 30, and to more reduce the friction loss of the water flow.

Second Embodiment

Next, a hydraulic turbine in a second embodiment will be described using FIG. 5.

Figure 5:
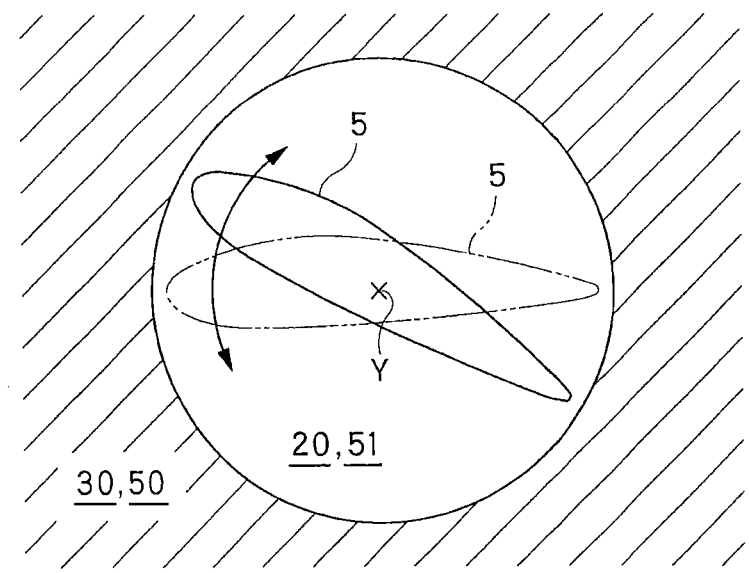
FIG. 5 is a view illustrating a cover non-coating region formed on an upper cover and a lower cover in a second embodiment.

In the second embodiment illustrated in FIG. 5, a main difference is that a non-coating region is provided for an upper cover and a lower cover, and other configurations are approximately identical to those of the first embodiment illustrated in FIGS. 1 to 4. In FIG. 5, the same parts as in the first embodiment illustrated in FIGS. 1 to 4 are given the same symbols, and detailed description thereof will be omitted.

As illustrated in FIG. 5, a running water surface 20 of an upper cover 6 has a coating region 50 in which a coating layer 30 is provided, and a cover non-coating region 51 in which no coating layer 30 is provided. In the cover non-coating region 51 of these regions, the running water surface 20 of the upper cover 6 is exposed. When viewed in a direction taken along a rotational axis Y (see FIG. 1) of a guide vane 5 (in the state of FIG. 5), the cover non-coating region 51 is formed to include (or cover) a rotation region of the guide vane 5. In the present embodiment, the cover non-coating region 51 is formed around the rotational axis of the guide vane 5 in a circular shape. Preferably, a radius of the cover non-coating region 51 is approximately equal to the maximum rotation radius of the guide vane 5 or is greater than the maximum rotation radius. In this way, when viewed in the direction taken along the rotational axis, the rotation region of the guide vane 5 is adapted to avoid overlapping the coating region 50.

Like the upper cover 6, the lower cover 7 also has a coating region 50 and a cover non-coating region 51. When viewed in the direction taken along the rotational axis of the guide vane 5, the cover non-coating region 51 is formed to include the rotation region of the guide vane 5.

Thus, according to the present embodiment, the cover non-coating region 51 of the upper cover 6 and the cover non-coating region 51 of the lower cover 7 are formed to include the rotation region of the guide vane 5 when viewed in the direction taken along the rotational axis of the guide vane 5. Thereby, it is possible to prevent the rotating guide vane 5 from coming into contact with the coating layer 30, and to thus prevent the coating layer 30 from being separated. Further, in the cover non-coating region 51, since the coating layer 30 does not intervene between the guide vane 5 and the upper cover 6 and between the guide vane 5 and the lower cover 7, a gap between the guide vane 5 and the upper cover 6 and a gap between the guide vane 5 and the lower cover 7 can be prevented from being reduced. Thereby, it is possible to prevent sand or foreign substances such as dust from being put in these gaps, and to thus prevent the coating layer 30 from being scratched or separated. For this reason, the coating layer 30 is prevented from being damaged, and the coating layer 30 is prolonged in service life, so that it is possible to enjoy an effect of reducing the friction loss based on the coating layer 30 for a long time.

Third Embodiment

Next, a hydraulic turbine in a third embodiment will be described using FIGS. 6 and 7.

Figure 6:
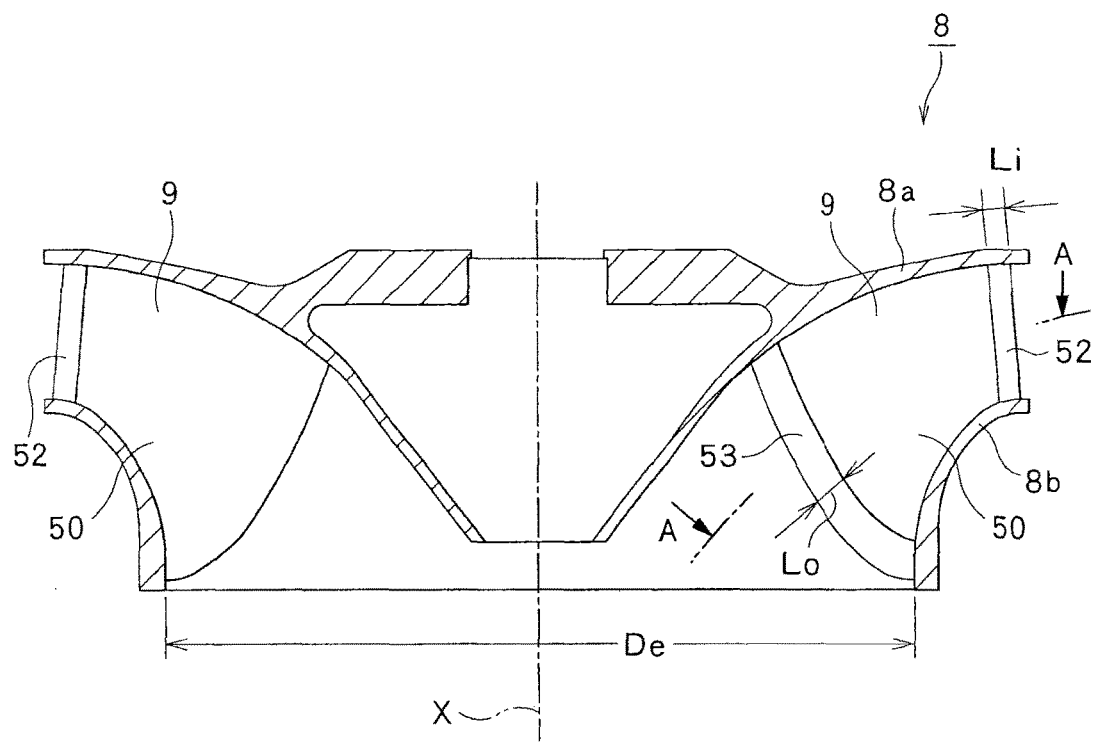
FIG. 6 is a longitudinal section view illustrating a runner in a third embodiment.
Figure 7:
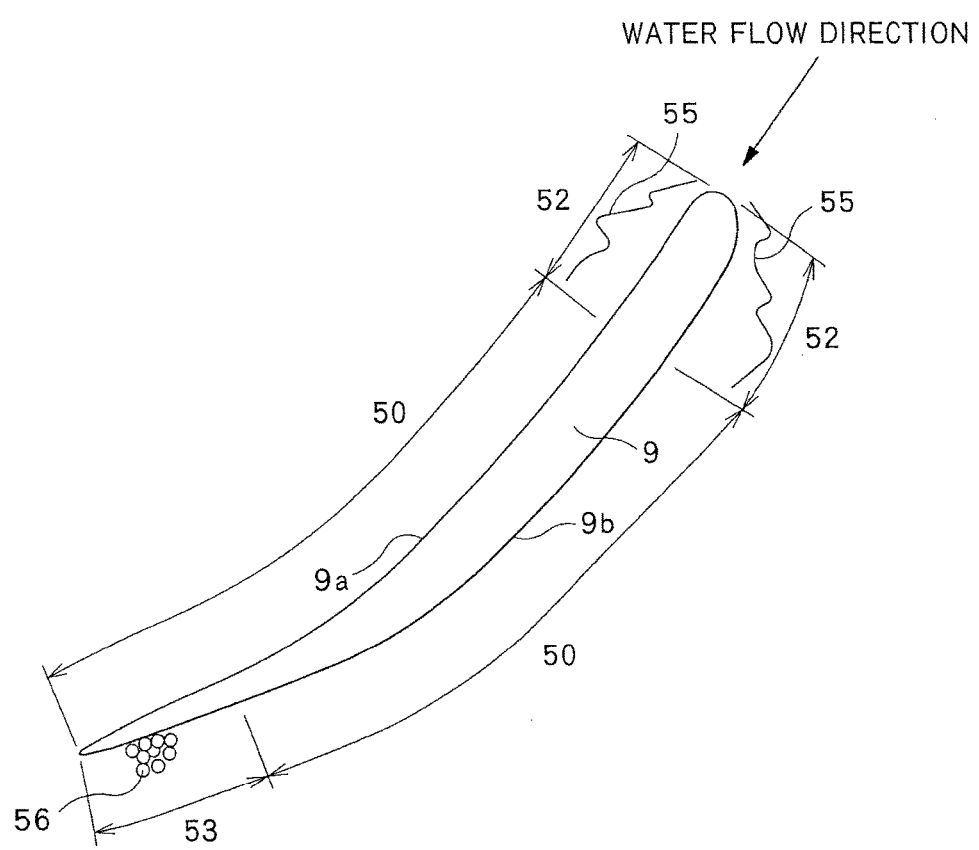
FIG. 7 is a cross-sectional view taken along line A-A which illustrates a runner blade of the runner of FIG. 6.

In the third embodiment illustrated in FIGS. 6 and 7, a main difference is that a non-coating region is provided for each runner blade of a runner, and other configurations are approximately identical to those of the first embodiment illustrated in FIGS. 1 to 4. In FIGS. 6 and 7, the same parts as in the first embodiment illustrated in FIGS. 1 to 4 are given the same symbols, and detailed description thereof will be omitted.

As illustrated in FIGS. 6 and 7, a running water surface 20 of each runner blade 9 of a runner 8 has a pressure surface (driving face) 9a and a suction surface 9b. Further, the running water surface 20 of the runner blade 9 has a coating region 50 for which a coating layer 30 is provided, and an upstream non-coating region 52 in which the coating layer 30 is not provided. The upstream non-coating region 52 is formed at an upstream end (an inlet-side end or a guide vane-side end) of each of the pressure and suction surfaces 9a and 9b of the runner blade 9 during hydraulic turbine operation.

The upstream non-coating region 52 has a length that follows a main flow direction and is indicated in FIG. 6 by Li, and is formed to extend from a crown 8a toward a band 8b. When an outlet diameter (a diameter of a draft tube-side end) of the runner 8 during the hydraulic turbine operation is defined as De, the length Li of the upstream non-coating region 52 in the main flow direction is preferably given as follows.

$$Li/De \leq 0.8$$

The length Li defined in the expression above becomes a region in which flow separation 55 may generally occur during the hydraulic turbine operation. This prevents the coating layer 30 from being provided in the region in which the flow separation 55 may occur.

In other words, when a water flow direction of the water flowing into the runner 8 during the hydraulic turbine operation is not matched with the runner blade 9, flow separation 55 can occur at the pressure surface 9a or the suction surface 9b at an upstream end of the runner blade 9 as illustrated in FIG. 7. However, as described above, the upstream non-coating region 52 is formed on the pressure surface 9a and the suction surface 9b at the upstream end of the runner blade 9. This can prevent the coating layer 30 from being provided in the region in which the flow separation 55 can occur during the hydraulic turbine operation.

Further, as illustrated in FIGS. 6 and 7, the running water surface 20 of the runner blade 9 further includes a downstream non-coating region 53 in which the coating layer 30 is not provided. The downstream non-coating region 53 is formed at a downstream end (an outlet-side end or a draft tube-side end) of the suction surface 9b of the runner blade 9 during the hydraulic turbine operation.

The downstream non-coating region 53 has a length that follows the main flow direction and is indicated in FIG. 6 by Lo, and is formed to extend from the crown 8a toward the band 8b. When the outlet diameter (the diameter of the draft tube-side end) of the runner 8 during the hydraulic turbine operation is defined as De, the length Lo of the downstream non-coating region 53 in the main flow direction is preferably given as follows.

$$Lo/De \leq 0.8$$

The length Lo defined in the expression above becomes a region in which cavitation 56 can generally occur during the hydraulic turbine operation. This prevents the coating layer 30 from being provided in the region in which the cavitation 56 can occur.

In other words, when a flow rate of the water flowing into the runner 8 is more than a design point (or when output is high), the cavitation 56 can occur in the vicinity of the suction surface 9b at a downstream end of the runner blade 9 as illustrated in FIG. 7. However, as described above, downstream non-coating region 53 is formed on the suction surface 9b at the downstream end of the runner blade 9. This can prevent the coating layer 30 from being provided in the region in which the cavitation 56 can occur during the hydraulic turbine operation.

Thus, according to the present embodiment, the upstream non-coating region 52 is formed at the upstream end of each of the pressure and suction surfaces 9a and 9b of the runner blade 9 during the hydraulic turbine operation. This can prevent the coating layer 30 from being provided in the region in which the flow separation 55 can occur. Further, the downstream non-coating region 53 is formed at the downstream end of the suction surface 9b of the runner blade 9 during the hydraulic turbine operation. This can prevent the coating layer 30 from being provided in the region in which the cavitation 56 can occur. For this reason, the coating layer 30 is prevented from being damaged by the flow separation 55 and/or the cavitation 56, and the coating layer 30 is prolonged in service life, so that it is possible to enjoy the effect of reducing the friction loss based on the coating layer 30 for a long time.

Figure 8:
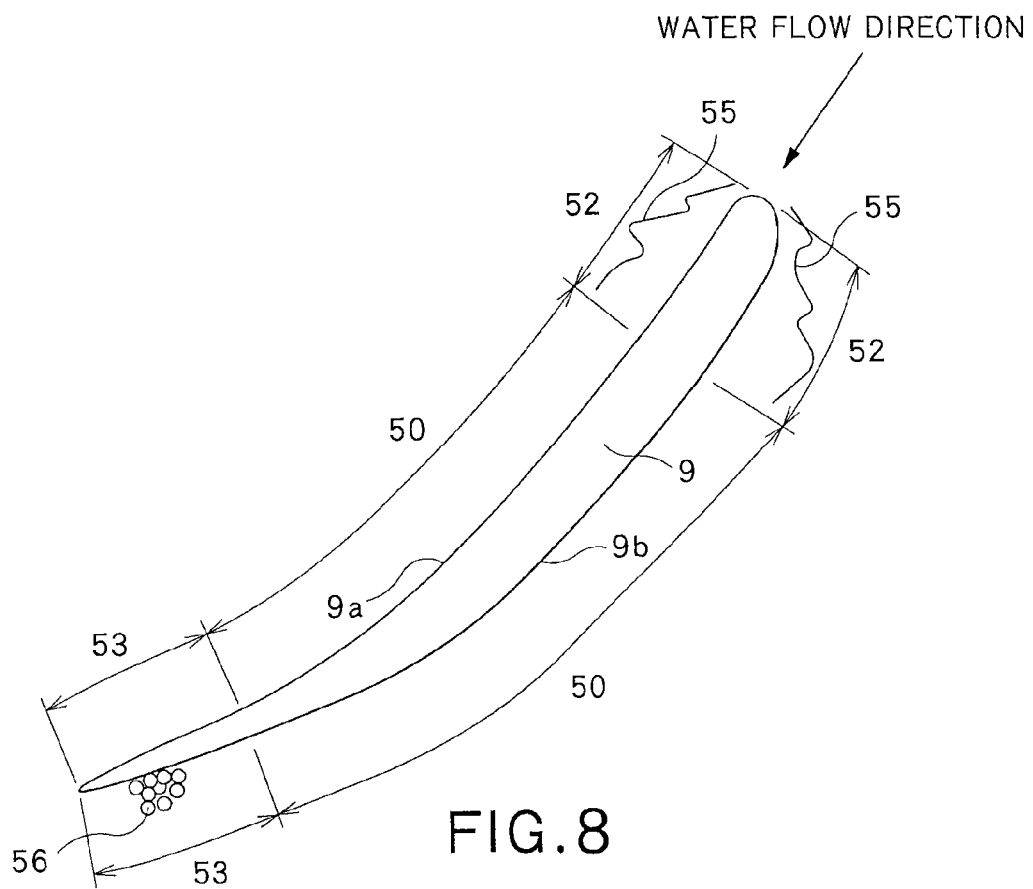
FIG. 8 is a view illustrating a modification of FIG. 6.

In the aforementioned present embodiment, as illustrated in FIG. 8, the downstream non-coating region 53 may be formed also at a downstream end (an outlet-side end or a draft tube-side end) of the pressure surface 9a of the runner blade 9. In other words, the downstream non-coating region 53 may be formed on both the pressure surface 9a and the suction surface 9b at the downstream end of the runner blade 9 during the hydraulic turbine operation.

Since the water flows from the draft tube 12 toward the casing 3 during the pump operation in a direction opposite to that during the hydraulic turbine operation, when the water flow direction of the water flowing into the runner 8 is not matched with the shape of the runner blade 9, the flow separation 55 can occur on the pressure surface 9a or the suction surface 9b at the draft tube-side end (the inlet-side end during the pump operation or the downstream end during the hydraulic turbine operation) of the runner blade 9. However, as described above, when the downstream non-coating region 53 is formed at the draft tube-side ends of the pressure and suction surfaces 9a and 9b of the runner blade 9 during the hydraulic turbine operation, it is possible to prevent the coating layer 30 from being provided in the region in which the flow separation 55 may occur. Thereby, even in the case of conducting the pump operation of the Francis turbine 1, it is possible to prevent the coating layer 30 from being damaged. In other words, when the pump operation of the Francis turbine 1 is scheduled, the downstream non-coating region 53 is preferably formed on both the pressure surface 9a and the suction surface 9b at the downstream end of the runner blade 9 during the hydraulic turbine operation.

Fourth Embodiment

Next, a hydraulic turbine in a fourth embodiment will be described using FIG. 9.

Figure 9:
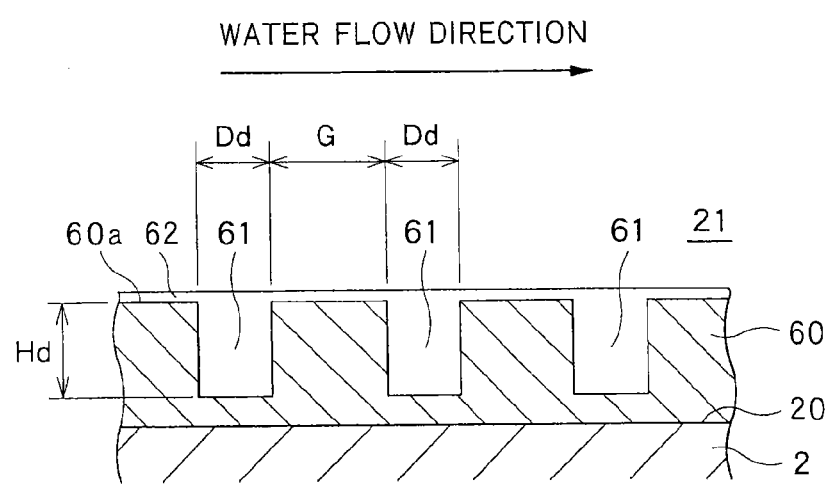
FIG. 9 is a cross-sectional view illustrating a coating layer in a fourth embodiment.

In the fourth embodiment illustrated in FIG. 9, a main difference is that a coating layer is formed by hydrophilic paint, and other configurations are approximately identical to those of the first embodiment illustrated in FIGS. 1 to 4. In FIG. 9, the same parts as in the first embodiment illustrated in FIGS. 1 to 4 are given the same symbols, and detailed description thereof will be omitted.

As illustrated in FIG. 9, a running water surface 20 is provided with a coating layer 60 formed by hydrophilic paint. The coating layer 60 can be formed on the running water surface 20 by coating the hydrophilic paint. The hydrophilic paint is not particularly limited as long as it has hydrophilicity. For example, paint containing a material having a hydrophilic group (—OH) may be properly used. Further, a contact angle of the hydrophilic paint is preferably equal to or less than, for instance, 40 degrees.

Similarly to the coating layer 30 and the dimples 31 illustrated in FIGS. 2A and 2B, the coating layer 60 is preferably provided with a plurality of (or multiple) dimples 61 open to the channel 21. Each dimple 61 preferably has a depth that is not less than 0.05 times and not more than 0.15 times a diameter of an inscribed circle of the dimple 61 when a planar shape of the dimple 61 is a polygonal shape, or a diameter of the dimple 61 when a planar shape of the dimple 61 is a circular shape. On the other hand, the planar shape of the dimple 61 is not particularly limited, but it is preferably a circular shape or a hexagonal shape. For example, if a diameter of an inscribed circle of the polygonal dimple 61 or a diameter (for example, Dd illustrated in FIG. 9) of the circular dimple 61 is 1 mm, the depth (for example, Hd illustrated in FIG. 9) of the dimple 61 is preferably not less than 50 μm and not more than 150 μm.

Further, an interval between the dimples 61 adjacent to each other is preferably not less than 0.8 times and not more than 1.2 times the diameter of the inscribed circle of the dimple 61 when the planar shape of the dimple 61 is the polygonal shape, or the diameter of the dimple 61 when the planar shape of the dimple 61 is the circular shape. Thereby, an effect of reducing viscosity resistance of the water flow according to the dimples 61 can be effectively produced, which is experimentally confirmed by the inventors. For example, if the diameter of the inscribed circle of the polygonal dimple 61 or the diameter (Dd illustrated in FIG. 9) of the circular dimple 61 is 1 mm, the interval (G illustrated in FIG. 9) between the dimples 61 is preferably not less than 0.8 mm and not more than 1.2 mm.

Further, the coating layer 60 illustrated in FIG. 9 can be formed to be similar to the coating layer 30 illustrated in FIG. 2A, and is preferably formed on the running water surface 20 provided for each member, such as the casing 3.

During the hydraulic turbine operation and the pump operation, a flow of the water along the running water surface 20 is formed inside the channel 21 defined by the running water surface 20 of the casing 3 etc. The running water surface 20 is provided with the coating layer 60 formed by the hydrophilic paint. Thereby, a thin water adhesion layer 62 is formed on a surface 60a of the coating layer 60 in such a manner that water is adhered. The water adhesion layer 62 is interposed between the main flow and the coating layer 60. Further, the water forming the water adhesion layer 62 is not at a standstill with respect to the coating layer 60, but it has an extremely low flow velocity. With the above configuration, it is possible to reduce the viscosity resistance of the water flow in the proximity of the coating layer 60 and to reduce the friction loss of the main flow against the running water surface 20.

Further, the coating layer 60 is provided with the a plurality of dimples 61. In this case, the water in the dimples 61 is adapted to be adhered to walls of the dimples 61 formed by the hydrophilic paint, and thus a flow velocity of the water in the dimples 61 is extremely reduced. Thereby, an effect of increasing a thickness of the water adhesion layer 62 described above is obtained in a region in which the dimples 61 are provided within the running water surface 20. For this reason, the viscosity resistance of the water flow flowing above the dimples 61 can be more reduced, and the main flow can smoothly flow on the running water surface 20.

Thus, according to the present embodiment, the running water surface 20 is provided with the coating layer 60 formed by the hydrophilic paint. Thereby, it is possible to form the adhesion layer 62 of the water having an extremely low flow velocity on the surface 60a of the coating layer 60, and to reduce the friction loss of the water flow flowing in the channel 21 defined by the running water surface 20. For this reason, it is possible to improve the efficiency of the hydraulic turbine by making good use of energy of the water flowing into the casing 3.

Further, according to the present embodiment, the coating layer 60 is provided with the a plurality of dimples 61. Thereby, it is possible to more reduce the viscosity resistance of the water flow in the proximity of the coating layer 60, and to more reduce the friction loss of the water flow.

Fifth Embodiment

Next, a hydraulic turbine in a fifth embodiment will be described using FIGS. 10 to 14.

In the fifth embodiment illustrated in FIGS. 10 to 14, a main difference is that a back pressure chamber coating layer having hydrophilicity is provided on a surface of a crown which is located in a back pressure chamber, and a lateral pressure chamber coating layer having hydrophilicity is provided on a surface of a band which is located in a lateral pressure chamber, and other configurations are approximately identical to those of the first embodiment illustrated in FIGS. 1 to 4. In FIGS. 10 to 14, the same parts as in the first embodiment illustrated in FIGS. 1 to 4 are given the same symbols, and detailed description thereof will be omitted.

Here, as an example of the hydraulic turbine, a Francis turbine will be described by way of example.

Figure 10:
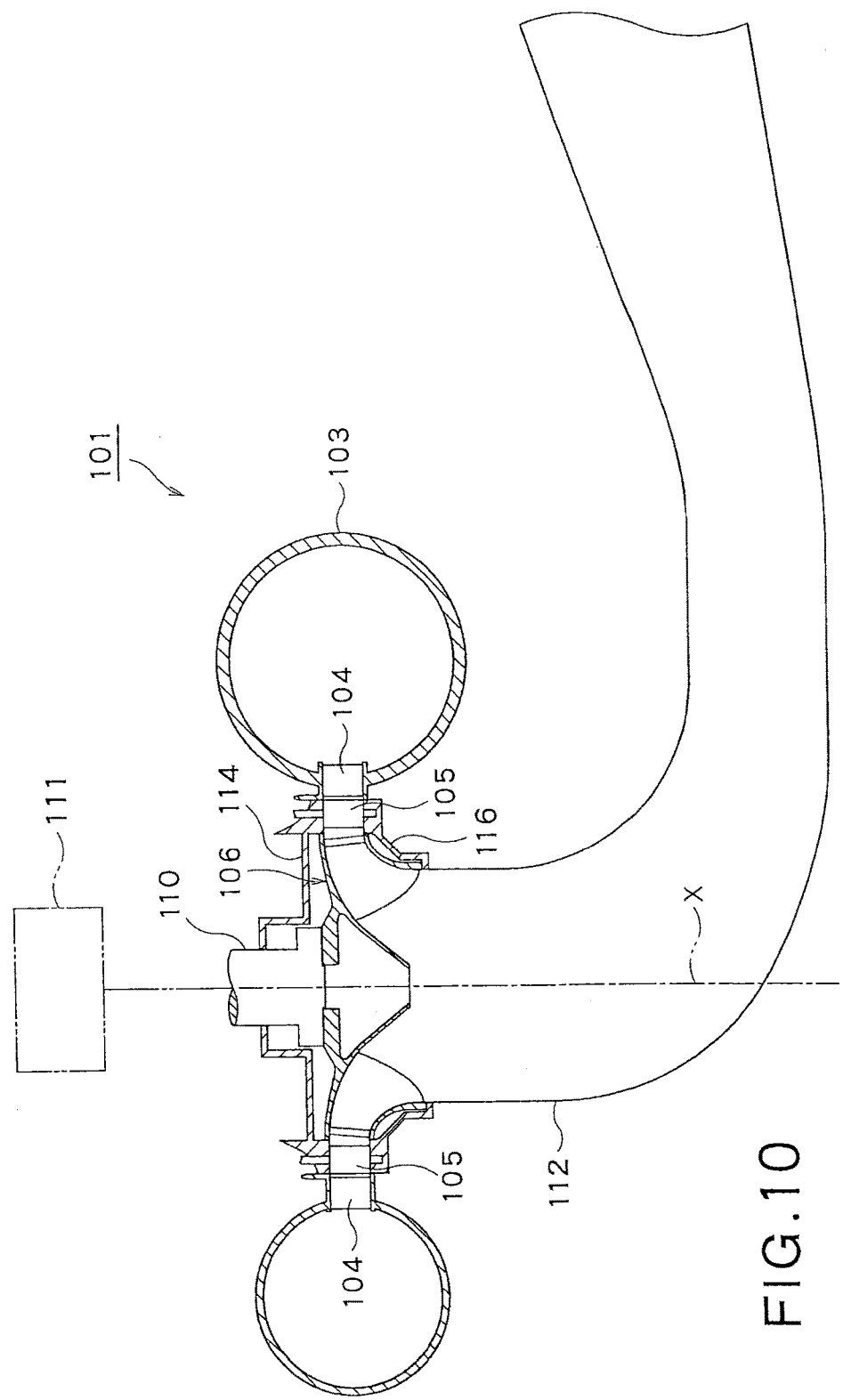
FIG. 10 is a cross-sectional view illustrating an overall configuration of a hydraulic turbine in a fifth embodiment.

As illustrated in FIG. 10, a Francis turbine 101 is equipped with a spiral casing 103 into which water flows from an upper reservoir 201 (see FIG. 15) through a hydraulic iron pipe 200, a plurality of stay vanes 104, a plurality of guide vanes 105, and a runner 106. Among them, the stay vanes 104 are to guide the water flowing into the casing 103 to the guide vanes 105 and the runner 106, and are disposed at a given interval in a circumferential direction.

The guide vanes 105 are to guide the inflow water to the runner 106, and are disposed at a given interval in a circumferential direction. Further, each guide vane 105 is rotatably provided, and is configured to allow a flow rate of the water flowing into the runner 106 to be adjusted by rotation and the resultant variation in opening degree. Thereby, a capacity of power generation of a generator 111 to be described below can be adjusted.

The runner 106 is configured to be rotatable around a rotational axis X relative to the casing 103, and is rotatably driven by the water flowing therein from the casing 103. Further, as illustrated in FIG. 11, the runner 106 has a crown 107, a band 108, and a plurality of runner blades 109 provided between the crown 107 and the band 108. Among them, the runner blades 109 are disposed at a given interval in a circumferential direction.

As illustrated in FIG. 10, the generator 111 is connected to the runner 106 via a main shaft 110. The generator 111 is configured to generate power by rotation of the runner 106. A draft tube 112 for restoring a pressure of the water flow flowing out of the runner 106 is provided at a downstream side of the runner 106. The draft tube 112 is connected to a lower reservoir 202. The water rotatably driving the runner 106 is adapted to be discharged to the lower reservoir 202.

As illustrated in FIG. 11, a back pressure chamber 113 is formed outside (an upper side in FIG. 11) the crown 107 of the runner 106. To be more specific, an upper cover 114 is provided outside the crown 107, and the aforementioned back pressure chamber 113 is formed between the crown 107 and the upper cover 114. On the other hand, a lateral pressure chamber 115 is formed outside (a right side in FIG. 11 or a radial outer side) the band 108 of the runner 106. More particularly, a lower cover 116 is provided outside the band 108, and the aforementioned lateral pressure chamber 115 is formed between the band 108 and the lower cover 116.

Part of the water flowing through the guide vanes 105 flows into the back pressure and lateral pressure chambers 113 and 115 as a leakage flow. In other words, a back pressure chamber-side gap portion 117 is provided at a radial outer side (upstream side) of the crown 107. Water flows into the back pressure chamber 113 through the back pressure chamber-side gap portion 117. When a through-hole 118 is provided in the crown 107 of the runner 106 as illustrated in FIG. 11, the running water in the back pressure chamber 113 flows into the draft tube 112 through the through-hole 118. Further, a back pressure chamber-side seal portion (intermediate seal portion) 119 is provided at a radial inner side of the back pressure chamber 113 (more particularly, between the back pressure chamber 113 and the through-hole 118). The back pressure chamber-side seal portion 119 is formed such that it is difficult for water to flow due to a narrowest gap between the crown 107 that is a rotation-side portion and the upper cover 114 that is a standstill-side. Thereby, an inflow rate of the water from guide vanes 105 toward the back pressure chamber 113 is suppressed. The back pressure chamber-side seal portion 119 can be formed by a labyrinth seal.

On the other hand, a lateral pressure chamber-side gap portion 120 is provided at a radial outer side (upstream side) of the band 108. Water flows into the lateral pressure chamber 115 through the lateral pressure chamber-side gap portion 120. The running water in the lateral pressure chamber 115 flows into the draft tube 112 through a downstream gap portion 121 provided at a radial inner side (downstream side) of the band 108. Further, a lateral pressure chamber-side seal portion 122 is provided at a radial inner side of the lateral pressure chamber 115 (more particularly, between the lateral pressure chamber 115 and the downstream gap portion 121). The lateral pressure chamber-side seal portion 122 is formed such that it is difficult for water to flow due to a narrowest gap between the band 108 that is a rotation-side portion and the lower cover 116 that is a standstill-side. Thereby, an inflow rate of the water from guide vanes 105 toward the lateral pressure chamber 115 is suppressed. The lateral pressure chamber-side seal portion 122 can be formed by a labyrinth seal.

As described above, since the back pressure chamber 113 and the lateral pressure chamber 115 form a relatively narrow channel, a disk friction loss can occur while the water flows into the back pressure chamber 113 and the lateral pressure chamber 115 and the runner 106 is rotated.

Generally, since the channels in the back pressure and lateral pressure chambers 113 and 115 are relatively narrow, velocity gradients of the water flows passing through the back pressure and lateral pressure chambers 113 and 115 can be complicated from the rotation-side portions (the crown 107 and the band 108) to the standstill-side portions (the upper cover 114 and the lower cover 116). Thereby, the viscosity resistance can be increased, and the disk friction loss may be increased. Since disk friction acts in a direction so as to block energy with which the runner 106 rotates, it is difficult to improve the efficiency of the hydraulic turbine when the disk friction loss is increased.

As a countermeasure to reduce the disk friction loss, it can be taken into account to reduce an outer diameter of the runner 106. This is based on the fact that the disk friction loss is in proportion to the fifth power of a rotating disk radius. However, in the case of reducing the outer diameter of the runner 106, the hydraulic turbine is made smaller, so that output of the hydraulic turbine is reduced, and it is difficult to obtain desired performance.

Further, as another countermeasure, it can be taken into account to make adequate a channel area of the back pressure chamber 113 or the lateral pressure chamber 115. This is based on the fact that the disk friction loss can be reduced by decreasing the channel area of the back pressure chamber 113 or the lateral pressure chamber 115. However, if the channel area is too small, the friction loss of the back pressure or lateral pressure chamber 113 or 115 per se is increased, and it is difficult to make the channel area adequate.

Thus, in the present embodiment, to reduce the disk friction loss, coating layers 130 and 131 having hydrophilicity are provided on the running water surface (surface by which the channel of the running water is defined) of the back pressure chamber 113 and the running water surface of the lateral pressure chamber 115.

Figure 12A:
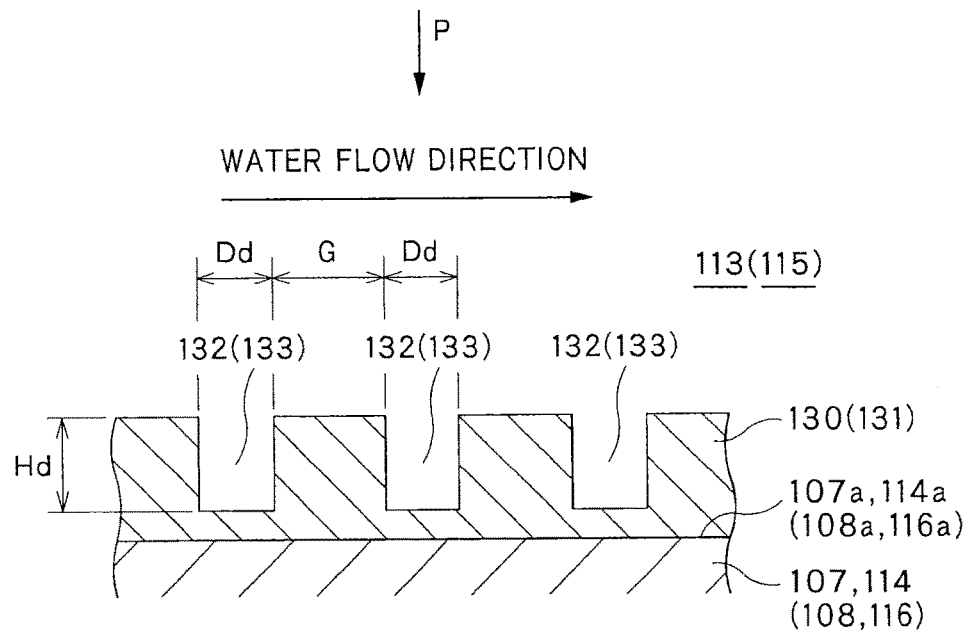
FIG. 12A is a cross-sectional view illustrating a coating layer in the hydraulic turbine of FIG. 10.
Figure 12B:
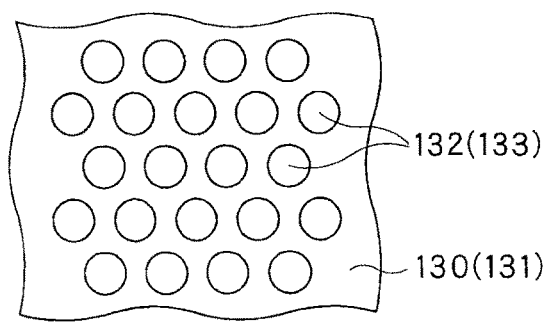
FIG. 12B is a view viewed in a direction of arrow P of FIG. 12A.

To be more specific, as illustrated in FIGS. 11, 12A, and 12B, the back pressure chamber coating layer 130 having hydrophilicity is provided on a surface (outer surface) 107a of the crown 107 which is located in the back pressure chamber 113. The back pressure chamber coating layer 130 may also be provided on a surface (inner surface) 114a of the aforementioned upper cover 114 which is located in the back pressure chamber 113. Here, the surface 107a of the crown 107 which is located in the back pressure chamber 113 and the surface 114a of the upper cover 114 which is located in the back pressure chamber 113 constitute the running water surface of the back pressure chamber 113. The back pressure chamber coating layer 130 is preferably disposed at a radial outer side (upstream side) relative to the aforementioned back pressure chamber-side seal portion 119. That is, the back pressure chamber coating layer 130 is not preferably formed on the back pressure chamber-side seal portion 119.

Further, the lateral pressure chamber coating layer 131 having hydrophilicity is provided on a surface (outer surface) 108a of the band 108 which is located in the lateral pressure chamber 115. The lateral pressure chamber coating layer 131 may also be provided on a surface (inner surface) 116a of the lower cover 116 which is located in the lateral pressure chamber 115. Here, the surface 108a of the band 108 which is located in the lateral pressure chamber 115 and the surface 116a of the lower cover 116 which is located in the lateral pressure chamber 115 constitute the running water surface of the lateral pressure chamber 115. The lateral pressure chamber coating layer 131 is preferably disposed at a radial outer side (upstream side) relative to the aforementioned lateral pressure chamber-side seal portion 122. That is, the lateral pressure chamber coating layer 131 is not preferably formed on the lateral pressure chamber-side seal portion 122.

In the present embodiment, the aforementioned back pressure and lateral pressure chamber coating layers 130 and 131 are formed by hydrophilic paint. Such hydrophilic paint is not particularly limited as long as it has hydrophilicity. For example, paint containing a material having a hydrophilic group (—OH), such as a hydrophilic fluorine material or hydrophilic ship's bottom paint, can be properly used. Further, the hydrophilic paint preferably has a contact angle of, for instance, 40 degrees or less (wherein the contact angle is an angle formed between a surface of the coating layer 130 or 131 which is a solid surface and a tangent line to an edge of water being in contact with the solid surface).

The back pressure chamber coating layer 130 is preferably provided with a plurality of back pressure chamber dimples (dimples) 132 open to the back pressure chamber 113. The back pressure chamber dimples 132 are formed in a part of the back pressure chamber coating layer 130 which is adjacent to the crown 107 and in a part of the back pressure chamber coating layer 130 which is adjacent to the upper cover 114. Similarly, the lateral pressure chamber coating layer 131 is preferably provided with a plurality of lateral pressure chamber dimples (dimples) 133 open to the lateral pressure chamber 115. The lateral pressure chamber dimples 133 are formed in a part of the lateral pressure chamber coating layer 131 which is adjacent to the band 108 and in a part of the lateral pressure chamber coating layer 131 which is adjacent to the lower cover 116.

The dimples 132 and 133 are formed in the corresponding coating layers 130 and 131 in a concave shape like a small pit. Each of the dimples 132 and 133 preferably has a depth that is not less than 0.05 times and not more than 0.15 times a diameter of an inscribed circle of each of the dimples 132 and 133 when the planner shapes of the dimples 132 and 133 have a polygonal shape, or a diameter of each of the dimples 132 and 133 when the planner shapes of the dimples 132 and 133 have a circular shape. Here, as the depth of each of the dimples 132 and 133 is set to not less than 0.05 times the diameter, the dimples 132 and 133 can be formed with high precision. As the depth of each of the dimples 132 and 133 is set to not more than 0.15 times the diameter, an increase in friction loss caused by the presence itself of the dimples 132 and 133 can be suppressed. On the other hand, the planer shape of the dimples 132 and 133 is not particularly limited, but it is preferably, for instance, a circular shape or a hexagonal shape. For example, if the diameter of the inscribed circle of each of the polygonal dimples 132 and 133 or the diameter (Dd illustrated in FIG. 12A) of each of the circular dimples 132 and 133 is 1 mm, the depth (Hd illustrated in FIG. 12A) of each of the dimples 132 and 133 is preferably not less than 50 µm and not more than 150 µm. A depth of each of the coating layers 130 and 131 is not particularly limited if the dimples 132 and 133 can be formed, if the running water surfaces (the surfaces 107a and 114a located in the back pressure chamber and the surfaces 108a and 116a located in the lateral pressure chamber) are not exposed to the bottoms of the dimples 132 and 133, and if the materials of the coating layers 130 and 131 can be left behind.

Further, an interval between the dimples 132 adjacent to each other and an interval between the dimples 133 adjacent to each other are preferably not less than 0.8 times and not more than 1.2 times the diameter of the inscribed circle of each of the dimples 132 and 133 when the planner shapes of the dimples 132 and 133 have the polygonal shape, or the diameter of each of the dimples 132 and 133 when the planner shapes of the dimples 132 and 133 have the circular shape. Thereby, an effect of reducing viscosity resistance of the water flow according to the dimples 132 and 133 can be effectively produced, which is experimentally confirmed by the inventors. For example, if the diameter of the inscribed circle of each of the polygonal dimples 132 and 133 or the diameter (Dd illustrated in FIG. 12A) of each of the circular dimples 132 and 133 is 1 mm, the interval (G illustrated in FIG. 12A) between the dimples 132 and the interval (G illustrated in FIG. 12A) between the dimples 133 are preferably not less than 0.8 mm and not more than 1.2 mm.

Figure 13A:
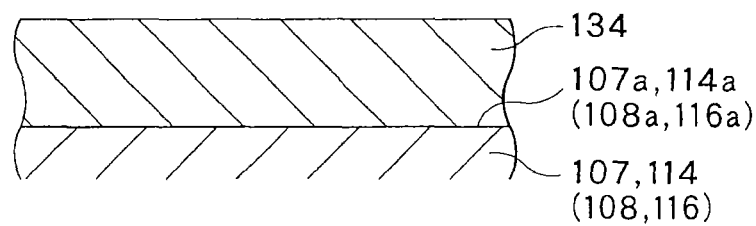
FIGS. 13A to 13C are views illustrating a method of forming the coating layer illustrated in FIGS. 12A and 12B.
Figure 13B:
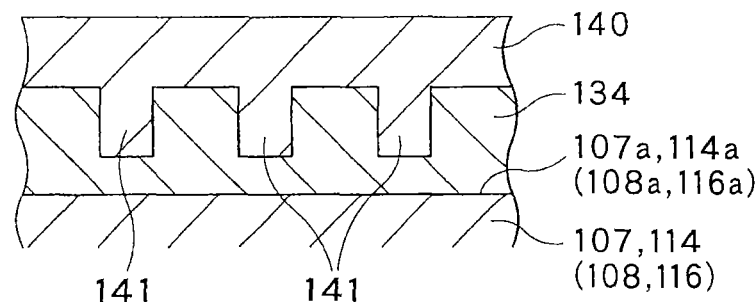
Figure 13C:
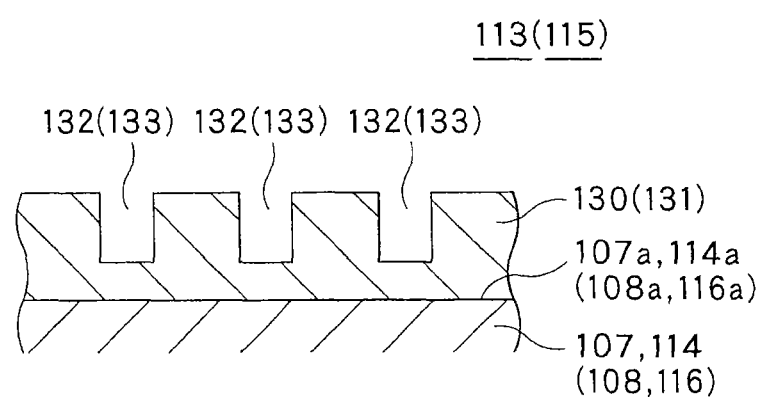

These coating layers 130 and 131 can be formed using, for instance, a mold 140 having bulges 141 corresponding to the dimples 132 and 133 of the coating layers 130 and 131 as illustrated in FIGS. 13A to 13C. In this case, as illustrated in FIG. 13A, hydrophilic paint is applied to the running water surface in a film shape at a given thickness first, and a paint film 134 is formed. Subsequently, as illustrated in FIG. 13B, the mold 140 is pressed against the paint film 134 of the hydrophilic paint. In this case, the mold 140 is pressed such that the paint film 134 remains between the bulges 141 of the mold 140 and the running water surface. Next, in the state in which the mold 140 is pressed, the paint film 134 is dried and cured. After the paint film 134 is cured, the mold 140 is removed as illustrated in FIG. 13C. Thereby, it is possible to obtain the coating layers 130 and 131 in the present embodiment. Further, a method of forming the coating layers 130 and 131 is not limited to the aforementioned method. For example, after the paint film of the hydrophilic paint is cured, the mold 140 is placed on the cured paint film, and the hydrophilic paint is applied to the surroundings of the bulges 141 of the mold 140, and cured. Thereby, it is also possible to obtain the coating layers 130 and 131 in the present embodiment.

Next, an operation of the present embodiment having such a configuration will be described.

When a hydraulic turbine operation is conducted in the Francis turbine 101 according to the present embodiment, as illustrated in FIG. 10, water flows from the upper reservoir 201 (see FIG. 15) into the casing 103 through the hydraulic iron pipe 200. The water flowing into the casing 103 flows from the casing 103 into the runner 106 through the stay vanes 104 and the guide vanes 105. Due to the water flowing into the runner 106, the runner 106 is rotatably driven. Thereby, the generator 111 connected to the runner 106 via the main shaft 110 is driven to generate power. The water flowing into the runner 106 is discharged from the runner 106 to the lower reservoir 202 through the draft tube 112. In the meantime, the guide vanes 105 are rotated. Thereby, the opening degree of the guide vanes 105 is adjusted, and the capacity of power generation of the generator 111 is adjusted.

Figure 14:
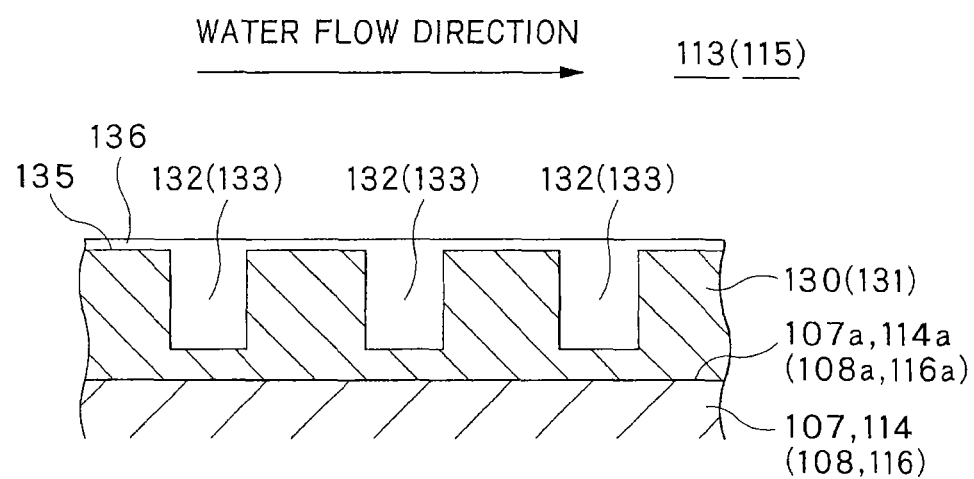
FIG. 14 is a view illustrating a function of dimples of the coating layer illustrated in FIGS. 12A and 12B.

While the hydraulic turbine is operated, part of the water passing through the guide vanes 105 flows into the back pressure chamber 113. In other words, the water flow flowing into the back pressure chamber 113 through the back pressure chamber-side gap portion 117 provided at the radial outer side of the crown 107 is formed. Thereby, as illustrated in FIG. 14, the water is adapted to be adhered to a surface 135 of the back pressure chamber coating layer 130, so that a thin water adhesion layer 136 is formed. The water adhesion layer 136 is interposed between the main flow formed by the running water located at the center side of the back pressure chamber 113 and the back pressure chamber coating layer 130. Further, the water forming the water adhesion layer 136 is not at a standstill with respect to the back pressure chamber coating layer 130, but it has an extremely slow flow velocity. With the aforementioned configuration, it is possible to reduce the viscosity resistance of the water flow in the proximity of the back pressure chamber coating layer 130, and to reduce the friction loss of the running water in the back pressure chamber 113 against the running water surfaces (the surfaces 107a and 114a located in the back pressure chamber).

Further, while the hydraulic turbine is operated, part of the water passing through the guide vanes 105 flows into the lateral pressure chamber 115. In other words, a flow of the water flowing into the lateral pressure chamber 115 through the lateral pressure chamber-side gap portion 120 provided at the radial outer side of the band 108 is formed. Even in this case, since a water adhesion layer 136 is formed similarly to the back pressure chamber 113, it is possible to reduce the viscosity resistance of the water flow in the proximity of the lateral pressure chamber coating layer 131, and to reduce the friction loss of the running water in the lateral pressure chamber 115 against the running water surfaces (the surfaces 108a and 116a located in the back pressure chamber).

The back pressure chamber coating layer 130 is provided with the a plurality of back pressure chamber dimples 132, and the lateral pressure chamber coating layer 131 is provided with the a plurality of lateral pressure chamber dimples 133. Thereby, the water in the dimples 132 and 133 is adapted to be adhered to walls of the dimples 132 and 133 formed by the hydrophilic paint, and a flow velocity of the water in the dimples 132 and 133 is extremely reduced. Thereby, an effect of increasing a thickness of the aforementioned water adhesion layer 136 in regions of the running water surfaces in which the dimples 132 and 133 are provided is obtained. For this reason, it is possible to more reduce the viscosity resistance of the water flow flowing above the dimples 132 and 133, and cause the running water to smoothly flow on the running water surfaces.

According to the present embodiment, as described above, the back pressure chamber coating layer 130 formed by the hydrophilic paint is provided on the surface 107a of the crown 107 which is located in the back pressure chamber 113. Further, the lateral pressure chamber coating layer 131 formed by the hydrophilic paint is provided on the surface 108a of the band 108 which is located in the lateral pressure chamber 115. Thereby, the adhesion layer 136 of the water having an extremely low flow velocity can be formed on the surfaces of the coating layers 130 and 131, and the friction loss of the water flow flowing in the back pressure chamber 113 and lateral pressure chamber 115 can be reduced. For this reason, it is possible to reduce the disk friction loss caused by the rotation of the runner 106. Further, in this case, since the outer diameter of the runner 106 is not restricted, the outer diameter of the runner 106 can be decided depending on desired output of the Francis turbine 101. In addition, the disk friction loss can be reduced regardless of the channel area and shape of the back pressure chamber 113 or the lateral pressure chamber 115.

Further, according to the present embodiment, as described above, the back pressure chamber coating layer 130 is provided on the surface 107a of the crown 107 which is located in the back pressure chamber 113 among the running water surface of the back pressure chamber 113. For this reason, it is possible to effectively reduce the viscosity resistance of the water flow in the crown-side's region of the back pressure chamber 113 which can be relatively increased in velocity gradient and is located at the crown 107. Likewise, the lateral pressure chamber coating layer 131 is provided on the surface 108a of the band 108 which is located in the lateral pressure chamber 115 among the running water surface of the lateral pressure chamber 115. For this reason, it is possible to effectively reduce the viscosity resistance of the water flow in the band-side's region of the lateral pressure chamber 115 which can be relatively increased in velocity gradient and is located at the band 108.

Further, according to the present embodiment, the back pressure chamber coating layer 130 is disposed at a radial outer side relative to the back pressure chamber-side seal portion 119, and the lateral pressure chamber coating layer 131 is disposed at a radial outer side relative to the lateral pressure chamber-side seal portion 122. Thereby, it is possible to prevent the back pressure chamber coating layer 130 from being formed at the back pressure chamber-side seal portion 119, and to prevent the lateral pressure chamber coating layer 131 from being formed at the lateral pressure chamber-side seal portion 122. For this reason, it is possible to prevent that an inflow rate of the water into the back pressure chamber 113 is increased on the ground that the friction loss of the water flow is reduced at the back pressure chamber-side seal portion 119 for suppressing the inflow rate of the water from the guide vanes 105 to the back pressure chamber 113. Similarly, it is possible to prevent that an inflow rate of the water into the lateral pressure chamber 115 is increased on the ground that the friction loss of the water flow is reduced at the lateral pressure chamber-side seal portion 122 for suppressing the inflow rate of the water from the guide vanes 105 to the lateral pressure chamber 115.

Further, according to the present embodiment, the back pressure chamber coating layer 130 is also provided on the surface 114a of the upper cover 114 which is located in the back pressure chamber 113, and the lateral pressure chamber coating layer 131 is provided on the surface 116a of the lower cover 116 which is located in the lateral pressure chamber 115. Thereby, it is possible to more reduce the friction loss of the water flow flowing in the back pressure chamber 113 and the lateral pressure chamber 115. Thus, it is possible to more reduce the disk friction loss caused by the rotation of the runner 106.

In addition, according to the present embodiment, the back pressure chamber coating layer 130 is provided with the a plurality of back pressure chamber dimples 132, and the lateral pressure chamber coating layer 131 is provided with the a plurality of lateral pressure chamber dimples 133. Thereby, it is possible to still more reduce the viscosity resistance of the water flow in the proximity of the coating layers 130 and 131, and to more reduce the friction loss of the water flow.

Thus, according to the present embodiment, it is possible to reduce the disk friction loss to improve the efficiency of the hydraulic turbine.

For example, in the aforementioned embodiment, the example in which the hydraulic turbine according to the present invention is applied to the Francis turbine has been described. However, without being limited thereto, the present invention can also be applied to other hydraulic turbines except the Francis turbine. Further, the Francis turbine in the above embodiment may have a pump operation function of suctioning up the water of the lower reservoir 202 to pump up it to the upper reservoir 201.

Further, in the above embodiment, the example in which the back pressure chamber coating layer 130 is provided on the running water surface of the back pressure chamber 113, and the lateral pressure chamber coating layer 131 is provided on the running water surface of the lateral pressure chamber 115 has been described. However, without being limited thereto, any one of the back pressure chamber coating layer 130 and the lateral pressure chamber coating layer 131 may be provided, and the other may not be provided. Even in this case, it is possible to reduce the disk friction loss caused by the rotation of the runner 106.

In addition, in the above embodiment, the example in which the coating layers 130 and 131 are formed by the hydrophilic paint has been described. However, without being limited thereto, if the base material such as the crown 107 or the band 108 of the runner 106, the upper cover 114, or the lower cover 116 or the like is formed of aluminum, the coating layers 130 and 131 may be formed by, for instance, boehmite treatment. In this case, an aluminum hydrated oxide film may be formed on a running water surface (surface) of the base material, and the coating layers 130 and 131 can have hydrophilic.

Sixth Embodiment

Next, a pipe in a sixth embodiment will be described using FIGS. 15 and 16.

Figure 15:
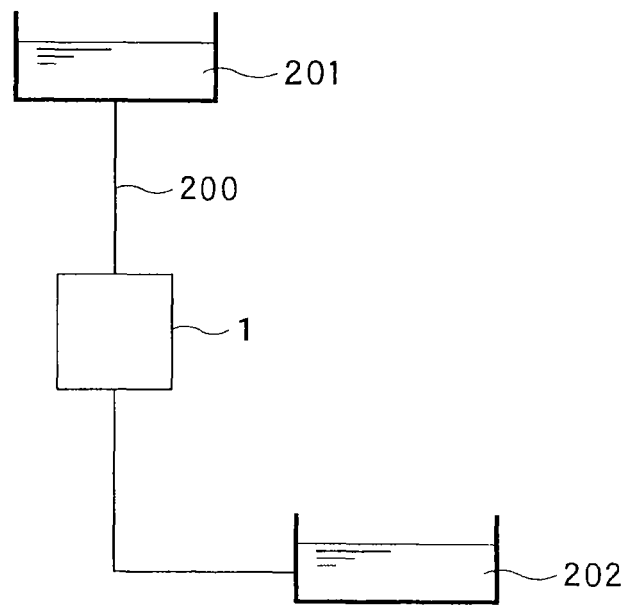
FIG. 15 is a schematic view illustrating a pipe in a sixth embodiment.
Figure 16:
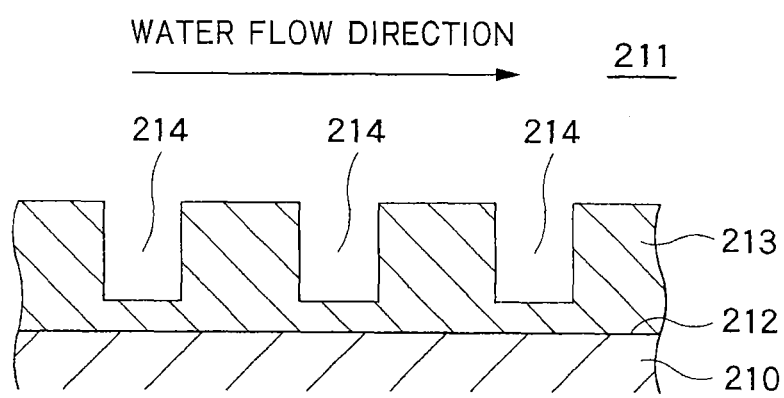
FIG. 16 is a cross-sectional view illustrating a coating layer provided on a running water surface of the pipe of FIG. 15.

In the sixth embodiment illustrated in FIGS. 15 and 16, a main difference is that a coating layer formed by hydrophilic paint is provided on a running water surface of the pipe, and other configurations are approximately identical to those of the first embodiment illustrated in FIGS. 1 to 4. In FIGS. 15 and 16, the same parts as in the first embodiment illustrated in FIGS. 1 to 4 are given the same symbols, and detailed description thereof will be omitted.

In the present embodiment, reference will be made to a Francis turbine 1 given as an example of a hydraulic turbine, and to a hydraulic iron pipe 200 that is given as an example of the pipe and guides water from an upper reservoir 201 to a casing 3 (see FIGS. 1 and 10) of the Francis turbine 1.

As illustrated in FIG. 15, the hydraulic iron pipe (pipe) 200 in the present embodiment is configured to be connected to the casing 3 of the Francis turbine 1, and to guide the water from the upper reservoir 201 to the casing 3 of the Francis turbine 1 during hydraulic turbine operation. The water flowing out of the Francis turbine 1 is adapted to be guided to a lower reservoir 202.

As illustrated in FIG. 16, the hydraulic iron pipe 200 is equipped with a pipe body 210 and a running water surface 212 that is provided for the pipe body 210 and defines a channel 211 for water. Among them, the running water surface 212 is provided with a coating layer 213 formed by hydrophilic paint, and the coating layer 213 is provided with a plurality of (or multiple) dimples 214 open to the channel 211. The coating layer 213 and the dimples 214 may be equally formed with the same configuration as the coating layer 60 and the dimples 61 described in the aforementioned fourth embodiment or the coating layers 130 and 131 and the dimples 132 and 133 described in the aforementioned fifth embodiment. Further, if the pipe body 210 is formed of aluminum, the coating layer 213 can be formed by, for instance, boehmite treatment.

Thus, according to the present embodiment, the coating layer 213 formed by the hydrophilic paint is provided on the running water surface 212. Thereby, an adhesion layer 62 (see FIG. 9) of the water having an extremely low flow velocity can be formed on a surface of the coating layer 213, and a friction loss of a water flow flowing in the channel 211 defined by the running water surface 212 can be reduced. For this reason, it is possible to prevent energy of the water flowing into the casing 3 of the Francis turbine 1 from being dissipated, and to make good use of the energy of the water to improve efficiency of the hydraulic turbine.

Further, according to the present embodiment, the coating layer 213 is provided with the a plurality of dimples 214. Thereby, it is possible to more reduce viscosity resistance of the water flow in the proximity of the coating layer 213 and to more reduce the friction loss of the water flow.

In the aforementioned present embodiment, the example in which the pipe is the hydraulic iron pipe 200 connected to the Francis turbine 1 has been described. However, the pipe connected to the hydraulic turbine is not limited to the hydraulic iron pipe 200 connected to the Francis turbine 1, and thus the present invention may be applied to an arbitrary pipe connected to an arbitrary hydraulic turbine.

According to the aforementioned embodiment, it is possible to reduce the friction loss to make good use of the energy of the water.

While certain embodiments of the present invention have been described, these embodiments have been presented by way of example only, and are not intended to limit the scope of the inventions. Indeed, the novel embodiments may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Further, it will be understood that these embodiments can be at least partially combined properly without departing from the gist of the present invention. Furthermore, in the above embodiments, the example in which the hydraulic turbine according to the present invention is applied to the Francis turbine has been described. However, without being limited thereto, the present invention may be applied to other hydraulic turbines except the Francis turbine.

The invention claimed is:

1. A hydraulic turbine for hydraulic power generation comprising:

a turbine body including a runner configured to be rotated by water flowing therein during hydraulic turbine operation, a guide vane configured to be rotated and adjust a flow rate of the water flowing into the runner, and a stay vane configured to guide the water to the guide vane and upper and lower covers opposite to each other, the guide vane being provided between the upper and lower covers and being rotatably supported by the upper and lower covers;

a running water surface provided in the turbine body, the running water surface defining a channel for water; and a coating layer provided on the running water surface of the runner the guide vane, and the upper and lower covers the coating layer being formed by hydrophilic paint;

the running water surface provided for the upper cover and the running water surface provided for the lower cover each have a respective cover non-coating region in which the coating layer is not provided; and the cover non-coating region is formed to include rotation region of the guide vane when viewed in a direction taken along a rotational axis of the guide vane.

2. The hydraulic turbine according to claim 1, wherein the coating layer includes a plurality of dimples open to the channel.

3. The hydraulic turbine according to claim 2, wherein the dimples have a depth that is not less than 0.05 times and not more than 0.15 times a diameter of an inscribed circle of each dimple when the planner shape of each dimple is a polygonal shape, or a diameter of each dimple when the planner shape of each dimple is a circular shape.

4. The hydraulic turbine according to claim 2, wherein an interval between the dimples adjacent to each other has not less than 0.8 times and not more than 1.2 times a diameter of an inscribed circle of each dimple when the planner shape of each dimple is a polygonal shape, or a diameter of each dimple when the planner shape of each dimple is a circular shape.

5. The hydraulic turbine according to claim 2, wherein the dimple has a depth of not less than 50 μm and not more than 150 μm.

6. The hydraulic turbine according to claim 1, wherein:

the runner of the turbine body includes a plurality of runner blades;

the running water surface provided for each runner blade has an upstream non-coating region in which the coating layer is not provided; and the upstream non-coating region is formed at upstream ends of pressure and suction surfaces of the running water surface of each runner blade during hydraulic turbine operation.

7. The hydraulic turbine according to claim 6, wherein, when an outlet diameter of the runner during the hydraulic turbine operation is defined as De, a length (Li) of the upstream non-coating region in a main flow direction is given as follows:

$$Li/De \leq 0.8.$$

8. The hydraulic turbine according to claim 1, wherein:

the runner of the turbine body includes a plurality of runner blades;

the running water surface provided for each runner blade has a downstream non-coating region in which the coating layer is not provided; and the downstream non-coating region is formed at a downstream end of a suction surface of the running water surface of each runner blade during the hydraulic turbine operation.

9. The hydraulic turbine according to claim 8, wherein, when an outlet diameter of the runner during the hydraulic turbine operation is defined as De, a length (Lo) of the downstream non-coating region in a main flow direction is given as follows:

$$Lo/De \leq 0.8.$$

* * * * *